(12) United States Patent
Stone (10) Patent No.: US 9,052,527 B1
(45) Date of Patent: Jun. 9, 2015

(54) SWIMMING GOGGLES

(71) Applicant: Richard T. Stone, Minneapolis, MN (US)

(72) Inventor: Richard T. Stone, Minneapolis, MN (US)

(*) Notice: Subject to any disclaimer, the term of this patent is extended or adjusted under 35 U.S.C. 154(b) by 0 days.

(21) Appl. No.: 13/874,858

(22) Filed: May 1, 2013

Related U.S. Application Data

(63) Continuation-in-part of application No. 12/807,721, filed on Sep. 13, 2010, now abandoned.

(60) Provisional application No. 61/276,470, filed on Sep. 12, 2009.

(51) Int. Cl.
*A61F 9/02* (2006.01)
*G02C 7/02* (2006.01)

(52) U.S. Cl.
CPC ........................................ *G02C 7/022* (2013.01)

(58) Field of Classification Search
CPC ........... A63B 33/002; A63B 2033/004; G02B 1/041; G02B 27/0176; A42B 3/32; A42B 3/228; F41H 1/04; A61F 9/026; A61F 9/029; A61F 9/028; A61F 9/02
USPC ............... 351/43, 159.01; 2/6.3, 6.7, 15, 426, 2/431, 435, 440, 442
See application file for complete search history.

(56) References Cited

U.S. PATENT DOCUMENTS 6,464,355 B1 * 10/2002 Gil ........................... 351/159.74

* cited by examiner

*Primary Examiner* — James Greece
(74) *Attorney, Agent, or Firm* — Eggink & Eggink; Anthony G. Eggink; Katrina M. Eggink (57) ABSTRACT

Swimming goggles that are shaped by approximately profiling the goggles to the swimmer's head resulting in the goggles having a minimal tendency to be pulled off or pulled ajar from the swimmer's head by hydrodynamic forces while exhibiting minimal hydrodynamic drag. Optical arrays molded into the lenses of the goggles permit standard vision both underwater and above the water.

20 Claims, 7 Drawing Sheets

Prior Art

Figure 4

Prior Art

SWIMMING GOGGLES

This application is a continuation-in-part of U.S. patent application Ser. No. 12/807,721, having the filing date of Sep. 13, 2010, and which claims the benefit of U.S. Provisional Patent Application Ser. No. 61/276,470, having the filing date of Sep. 12, 2009.

TECHNICAL FIELD

Swimming goggles that exhibit a hydrodynamically streamlined profile and provide for standard vision both underwater and above water.

BACKGROUND OF THE INVENTION

The present invention relates generally to swimming goggles for covering and protecting the eyes of a swimmer while enhancing the swimmer's vision. In particular this invention relates to swimming goggles that geometrically approximate a hydrodynamically streamlined profile with respect to the swimmer's head while simultaneously permitting standard vision when the swimmer's eyes are either above or below the water surface. More particularly, the invention relates to lens structures for swimming and diving goggles.

Swimming goggles, especially those for competitive swimmers, should provide several functions and exhibit several characteristics. Firstly, the goggles should protect the swimmer's eyes from the irritations of the water. In swimming pools these irritations are caused from chemical disinfectants such as chlorine, bromine, or ozone. Additional irritations are caused from incompatible pH levels, ionic concentrations, and chemical buffers in the pool water. Secondly, goggles should provide for standard vision both underwater and above water. Thirdly, the goggles should perform these functions without requiring the swimmer to alter his or her diving entry into the pool for fear of the goggles being displaced from the swimmer's head by hydrodynamic forces and moments. Fourthly, the goggles preferably exhibit no more hydrodynamic drag than if the swimmer were swimming without goggles. Prior art goggles have failed to satisfy all of these functions and characteristics.

Swimming goggles have been made to match a section of a hydrodynamically streamlined contour to the face. (For example, see FIG. 1.) Shaping goggles this way permits a swimmer to dive into the pool, turn and push off from walls, and swim with minimal concern that the goggles might be pulled off or pulled ajar due to hydrodynamic forces and moments. Additionally, the hydrodynamic drag of such goggles is less than that for coplanar lens swimming goggles, an advantage for competitive swimmers. The deficiency of these types of prior art goggles is that underwater binocular-like viewing is not standard. Incoming parallel rays diverge as they refract through the hydrodynamically streamlined lenses. (For example, see FIG. 2.) This requires that the swimmers eyes point in convergent directions to attain binocular focus while viewing underwater; the swimmer must adjust his or her eyes into a cross-eyed orientation to attain binocular vision. It is difficult to rapidly toggle back and forth from a cross-eyed orientation for underwater binocular viewing to a straight-ahead orientation for above water binocular viewing. Double images are observed when viewing underwater with both eyes looking straight ahead. Using these prior art goggles may cause headache, vertigo, or induce nausea.

To attain standard vision when wearing swimming goggles requires that parallel rays remain parallel when passing through the goggle lenses both above and below the water. Specifically, if two rays are parallel as they enter the lenses of the goggles with one ray passing through the left lens and on a trajectory to then intersect the center of rotation of left eye and the other ray passing through the right lens and on a trajectory to then intersect the center of rotation of the right eye, then they shall also be approximately parallel after both rays pass through the lenses of the goggles.

Figure 1:
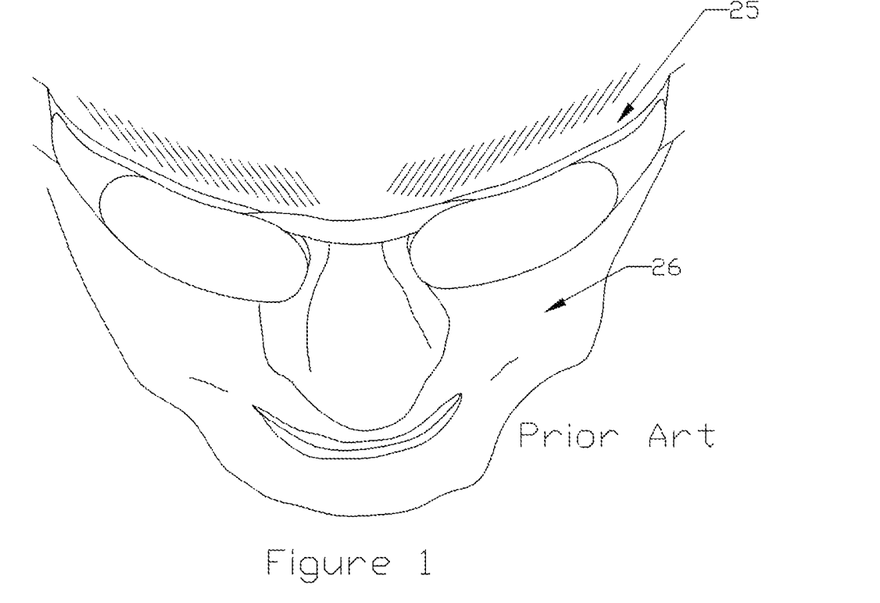
FIG. 1 is a perspective view of prior art goggles.
Figure 2:
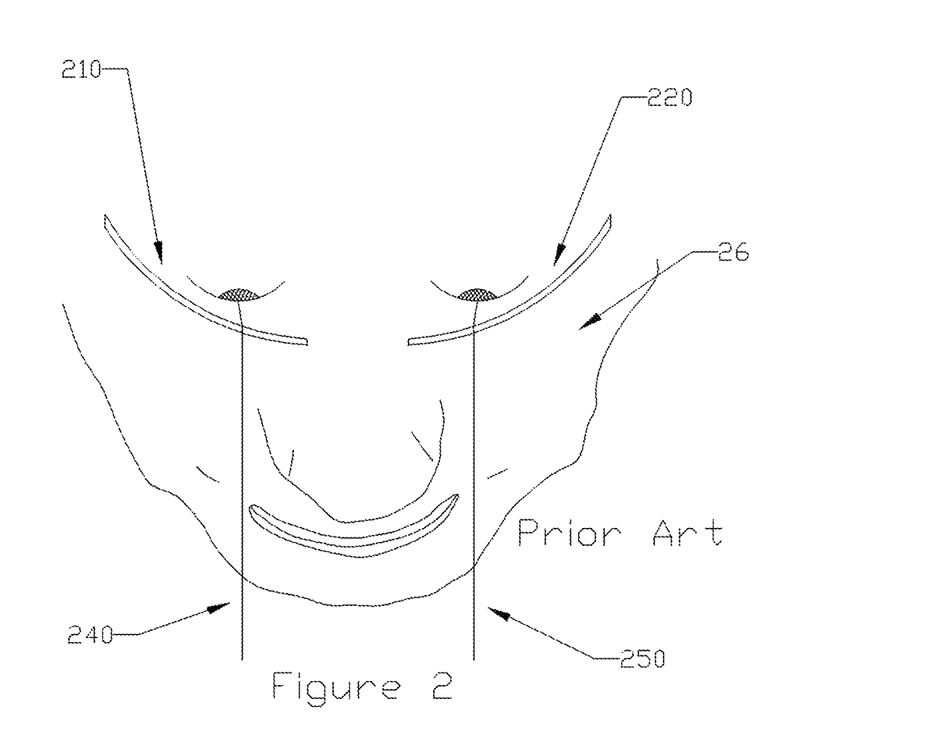
FIG. 2 is a top sectioned view of the prior art goggles of FIG. 1.
Figure 3:
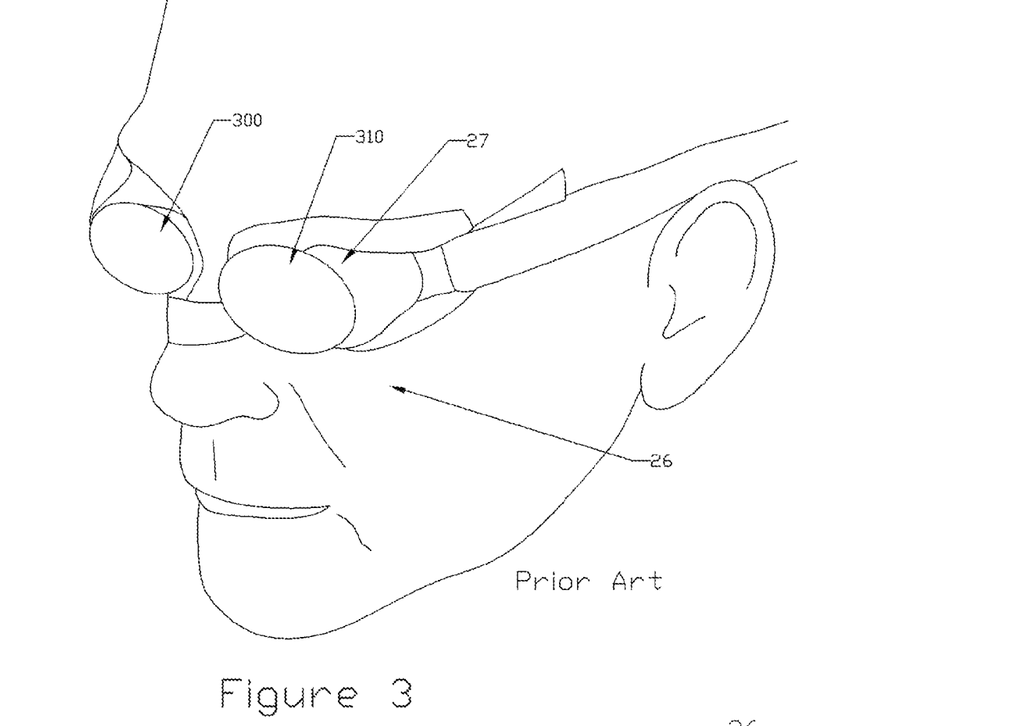
FIG. 3 is another perspective view of prior art goggles.
Figure 4:
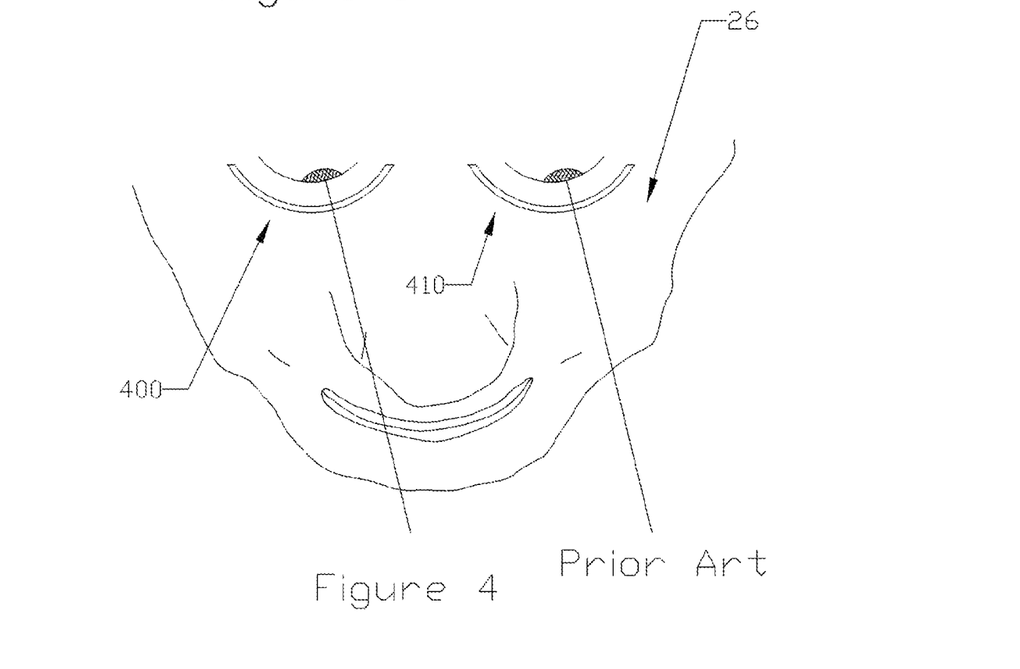
FIG. 4 is a sectioned view of prior art goggles wherein part of each lens is a spherical or cylindrical section.

Keeping rays parallel as they pass through the left and right lenses of goggles has been accomplished in the prior art in several ways. One technique disclosed by Bengtson et al., U.S. Pat. No. 4,051,557, utilizes coplanar sections of plastic or glass as part of the left and right lenses. Widenor, U.S. Pat. No. 3,027,562, discloses a flat section of plastic in front of the eyes which then curves in the peripheral region of viewing outside of binocular vision. Another technique, disclosed by Hagan, U.S. Pat. No. 3,672,750, uses a section of a sphere as the outer surface of each uniform thickness lens with the center of radius of each sphere close to the center of rotation of each eye. Here, any ray which is on a trajectory to intersect the center of rotation of an eye and is within the field of view of that eye is normal to the lens surface. Flory, U.S. Pat. No. 5,313,671, discloses use of a section of a cylinder instead of a sphere. These techniques preclude matching the contour of the face with a goggle that is minimally intrusive into the free stream of water such as shown in FIG. 1.

Swimming goggles of the prior art may also add optical corrections similar to those found in corrective prescription glasses to reduce the effects of visual deficiencies such as myopia, hypermetropia, and astigmatism. For coplanar lenses these corrections are often added to each of the inner lens surfaces with the outer surface of each lens remaining flat. Most commonly offered are simple spherical corrections in whole or half diopter steps.

Reducing the tendency of standard vision goggles from being pulled off or ajar has been addressed by the prior art in several ways. Drew, U.S. Pat. No. 4,279,039, discloses attaching coplanar lens goggles directly to the swim cap. Van Atta et al., U.S. Pat. No. 7,475,435, discloses reducing coplanar lens size. Fukasaw, U.S. Pat. No. 6,996,857, discloses adding fillets to the protruding sections of coplanar lens goggles.

Prior art refinements enhancing standard vision include blackening whole sections of the viewing field as disclosed by Yokota, U.S. Pat. No. 7,165,837.

SUMMARY OF THE INVENTION

The present invention relates to swimming goggles having lenses with outer surfaces which geometrically approximate a portion of a hydrodynamically streamlined profile while simultaneously providing for standard vision both above and below the water.

The present invention comprises swimming goggles with an optical array formed into both the inner and outer surfaces of the lenses of the goggles. The outer optical arrays have two functions. Firstly, the outer surfaces of the outer optical arrays geometrically approximate a portion of a hydrodynamically streamlined profile. Secondly, outer arrays optically approximate the outer surface of an optically appropriate lens section such as coplanar lenses. The inner array optically approximates the inner surface of an optically appropriate lens section without geometrically conflicting with human anatomy.

Goggles of this invention are less prone to being pulled off or pulled ajar from a swimmer's head by hydrodynamic forces or moments, particularly during a diving entry into the water. They also exhibit reduced hydrodynamic drag compared to other goggles that provide for standard vision. This is true both for the unsteady and for the steady hydrodynamic environments.

These and other benefits of this invention will become apparent from the following description by reference to the drawings.

DETAILED DESCRIPTION OF THE PREFERRED EMBODIMENTS

FIG. 1-4 show prior art goggles which are discussed in the Background of the Invention. The present invention relates to lenses which are used in swimming and diving goggles which essentially hold the lenses in position with respect to the eyes and face of the wearer. It is within the purview of the present invention to be used in connection with any means which hold lenses in position.

Figure 5:
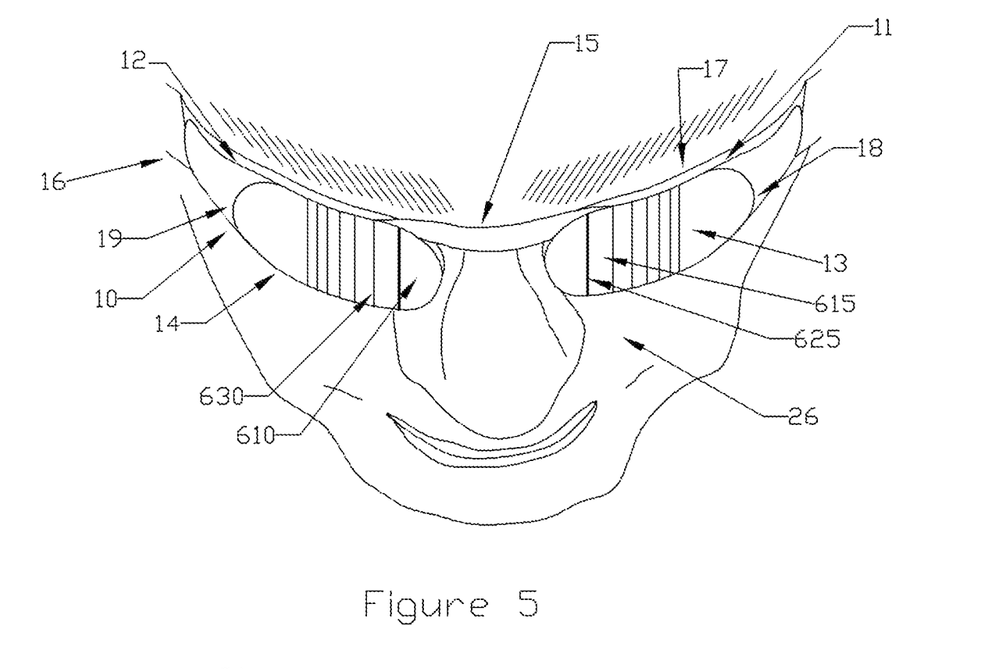
FIG. 5 is a perspective view of an embodiment of goggles of the present invention.
Figure 6:
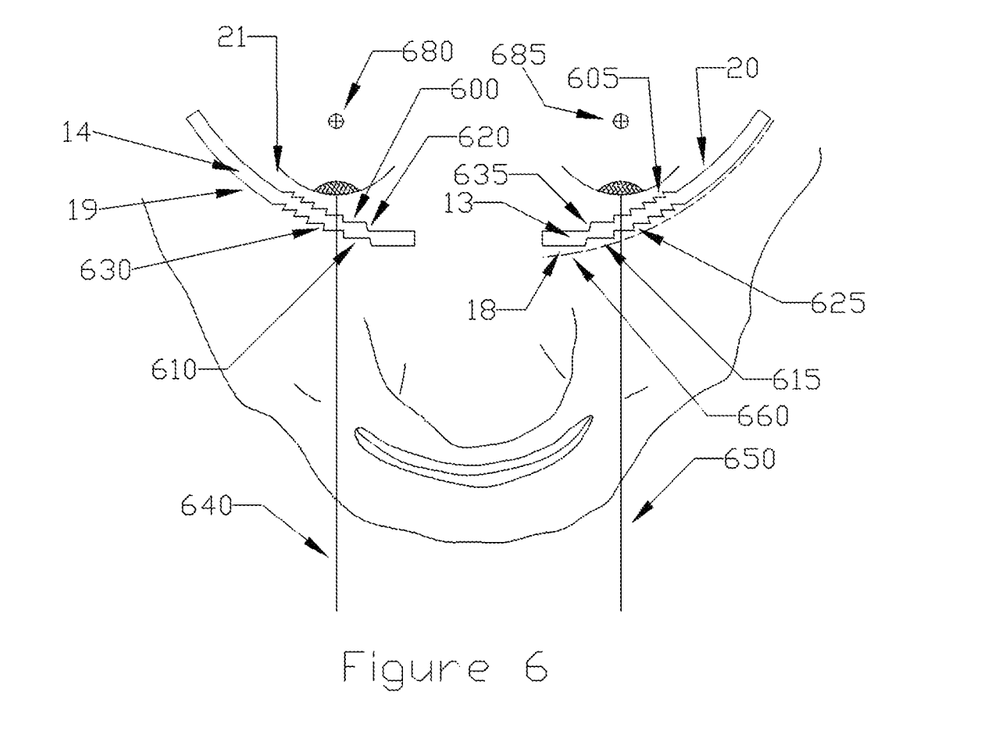
FIG. 6 is a top sectioned view of the goggles of FIG. 5.
Figure 7:
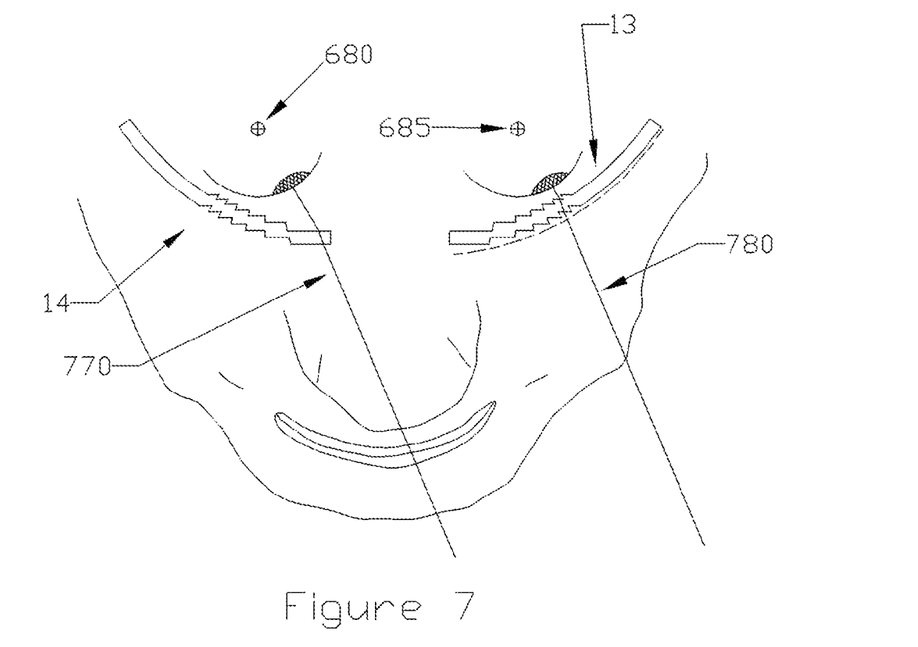
FIG. 7 is another sectioned view of the goggles of FIG. 5.

In one embodiment illustrated by FIG. 5, FIG. 6, and FIG. 7, swimming goggles 10 are shown having lens frames 11, 12, lenses 13, 14, nose-bridge 15, head strap 16, and eye seals 17. The lenses are shown having an exterior surface and incorporating optical arrays as part of both the inner surfaces 20, 21 and the outer surfaces 18, 19 of the exterior surfaces of the lenses 13, 14, respectively. Each optical array of goggles 10 consists of refractive surfaces alternating with return surfaces. The inner optical array for the right lens 14 consists of refractive surfaces 600 that are generally flat and parallel with each other and are approximately parallel to the inner refractive surfaces 605 of the inner optical array of the left lens 13. The outer refractive surfaces 610 on the right lens 14 are generally flat and also parallel with each other and are approximately parallel to the outer refractive surfaces 615 on the left lens 13. The inner refractive surfaces 600, 605 are not necessarily parallel to the outer refractive surfaces 610, 615. For example, as shown in lens 30 in FIG. 8, the outer refractive surfaces 31 are parallel to other outer refractive surfaces on each lens, but are not parallel to the inner refractive surfaces 32. The left and right lenses also need not be mirror images of each other. The number of inner refractive surfaces does not need to be the same as the number of outer refractive surfaces of the lens.

Rays, for example 640 and 650, observed by the swimmer both underwater and above water pass through the refractive surfaces 610 and 600, and 615 and 605 respectively. Two rays that are parallel with each other before passing through the goggle lenses are also parallel with each other after passing through the lenses. This is true both for rays coming from straight ahead such as 640 and 650, and for rays coming from the side, as depicted by 770 and 780 in FIG. 7. The optical rays 770 and 780 are shown in FIG. 7 with underwater refraction angles. The direction cosine of a ray may change after passing through a lens of the goggles. However, the change in the direction cosine will be approximately the same for an optical ray that will be entering the left lens as for a ray that will be entering the right lens if these two rays are parallel to each other before they enter the lenses. Parallel rays remain parallel after passing through the lenses of these goggles. This is true when the parallel rays are either both underwater or both above water.

Referring to FIG. 5-7, the size of the outer refractive surfaces 615 and the size of the outer return surfaces 625 may be reduced while the number of such surfaces is increased to ensure that the maximum distance between any point on the outer surface and a specified profile 660 is arbitrarily small. Any profile, for example profile 660, may be approximated to any degree of accuracy using only flat and parallel refractive surfaces 615 connected by return surfaces 625.

Figure 11:
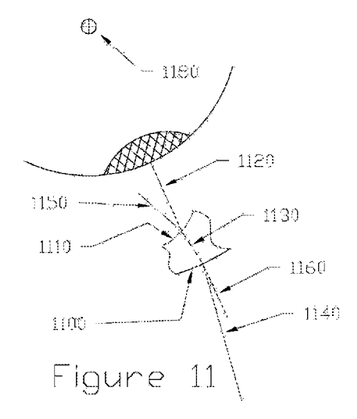
FIG. 11 is a sectioned view of an eye and a portion of a lens.

Referring to FIG. 11. This figure illustrates nomenclature. Shown is a ray 1140 entering the outer lens surface 1100 of a portion of a lens. The normal 1160 to the outer surface 1100 at the point that ray 1140 enters the outer lens surface is shown. After refracting at the outer lens surface 1100 the ray, now labeled as 1130, passes through the lens. After being refracted at the inner lens surface 1110 the ray, now labeled as 1120, is shown on a trajectory to intersect the center of rotation 1180 of the eye. Also shown is the normal 1150 to the inner refractive surface 1110 at the point the ray 1120 exits the inner refractive surface. For simplicity of illustration, details of the cornea and eye lens structures are not shown; the eye including the cornea and eye lens are shown contained within a portion of a sphere. Optical rays of interest will always be assumed to start at an object, enter the outer surface of a lens, pass through the lens, exit the inner surface of the lens, and then enter the eye.

Figure 12:
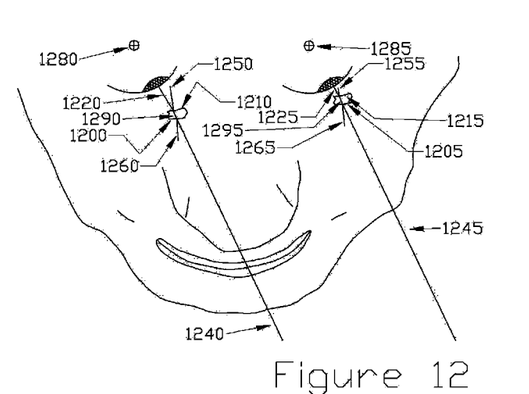
FIG. 12 is a sectioned view of the eyes and a portions of the lens.

Flat and parallel refractive lens surfaces are one embodiment. A more general embodiment that also provides for standard vision goggle lenses is illustrated by referring to FIG. 12. For two parallel rays 1245 and 1240 that refract at the left 1205 and right 1200 outer surfaces of the left and right lenses respectively with the left ray, now labeled as 1295, passing through the left lens section and the right ray, now labeled as 1290, passing through the right lens section, and the left ray 1295 refracting at the inner surface 1215 of the left lens and the right ray 1290 refracting at the inner surface 1210 of the right lens, with the left ray, now labeled as 1225, shown as the ray that is on a trajectory to intersect the center of rotation 1285 of the left eye and the right ray, now labeled as 1220, shown as the ray that is on a trajectory to intersect the center of rotation 1280 of the right eye. After the two parallel rays 1245 and 1240 pass through the lenses and exit as rays 1225 and 1220 respectively two constraints assure that rays 1225 and 1220 are parallel. Firstly, that the normals to the outer lens surfaces 1265 and 1260 are parallel to each other and secondly that the normals to the inner lens surfaces 1255 and 1250 are parallel to each other. This assures standard vision both above and below the surface of the water when the left and right lenses of the goggles are both underwater or are both above water.

Figure 9:
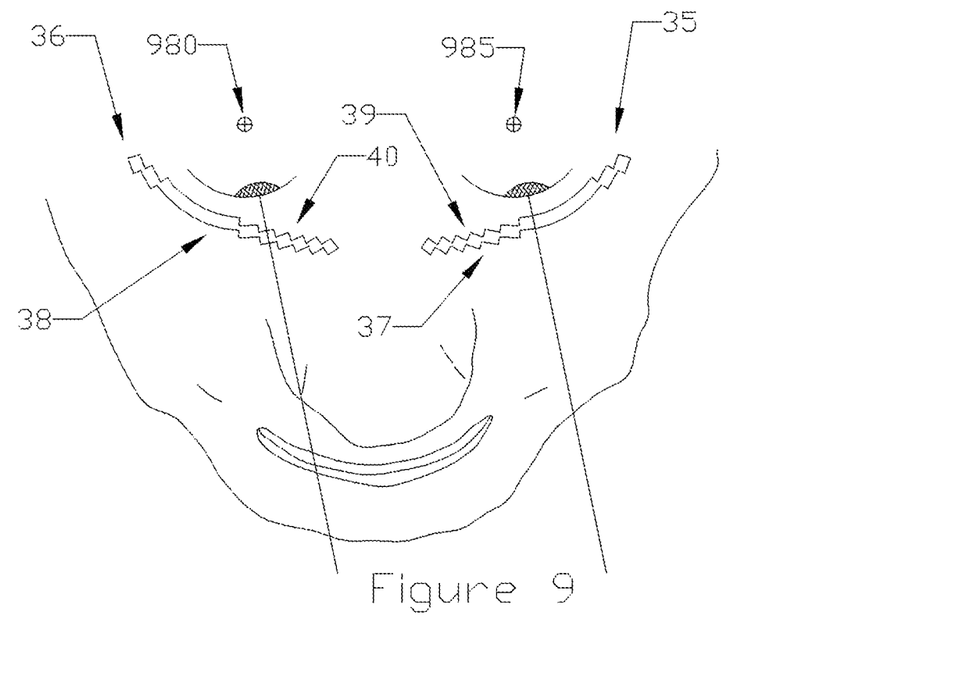
FIG. 9 is a sectioned view of another embodiment of the hydrodynamically streamlined goggles of the invention.

Another special case of the parallel normal constraint assuring standard vision is illustrated by FIG. 9. In this example, the refractive surfaces are sections of approximately spherical lenses with the center of curvature of the spherical surfaces approximately at the center of rotation of each eye. Here the right lens normals at the points of intersection are not just parallel with the respective left lens normals at the points of intersection. Here the lens normals at the points of intersection are also coincident with the respective rays.

Figure 8:
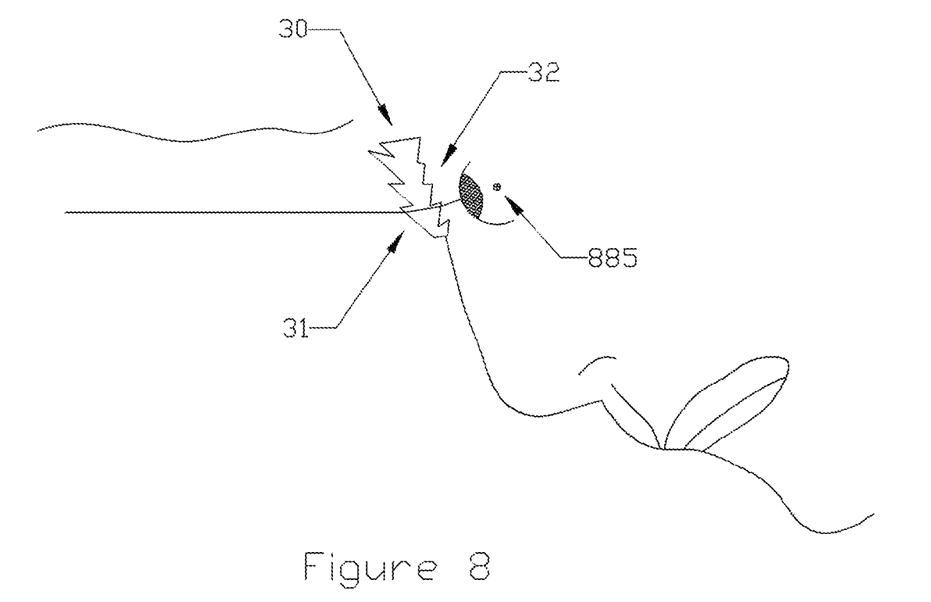
FIG. 8 is a sectioned side view showing another embodiment of the hydrodynamically streamlined goggles of the present invention.

The optical arrays as described in the instant invention with respect to the goggle embodiments of FIG. 5-12 exhibit several characteristics. Each optical array has at least two refractive surfaces. The change in direction of a ray crossing through a refractive surface may be zero degrees such as when a ray is normal to the refractive surface. See for example FIG. 9. Refractive surfaces are smooth or piecewise smooth, but not necessarily flat. Refractive surfaces are regions of the goggles through which visual images are observed. Adjacent refractive surfaces may be connected by return surfaces or may abut one another. The refractive surfaces of these optical arrays differ from two transparent sections of goggles which are adjacent to each other in the prior art in two ways. Firstly, at least two adjacent refractive surfaces are connected by a return surface. Secondly, for two parallel rays passing through the left and right lenses which are then on trajectories to intersect with the centers of rotation of the left and right eyes respectively, the normals to the outer surfaces of the lenses at the points of entry of the respective rays with the left and right outer lens surfaces differ by less than 15 degrees, and preferably by less than 5 degrees. Thirdly, for two parallel rays passing through the left and right lenses which are then on trajectories to intersect with the centers of rotation of the left and right eyes respectively, the normals to the inner surfaces of the lenses at the points of exit of the respective rays with the left and right inner lens surfaces differ by less than 15 degrees, and preferable by less than 5 degrees. The center of rotation 685 of the left eye and the center of rotation 680 of the right eye are shown in FIGS. 5-7. The center of rotation 885 of the left eye is shown in FIG. 8. The center of rotation 985 of the left eye and the center of rotation 980 of the right eye are shown in FIG. 9.

Figure 13:
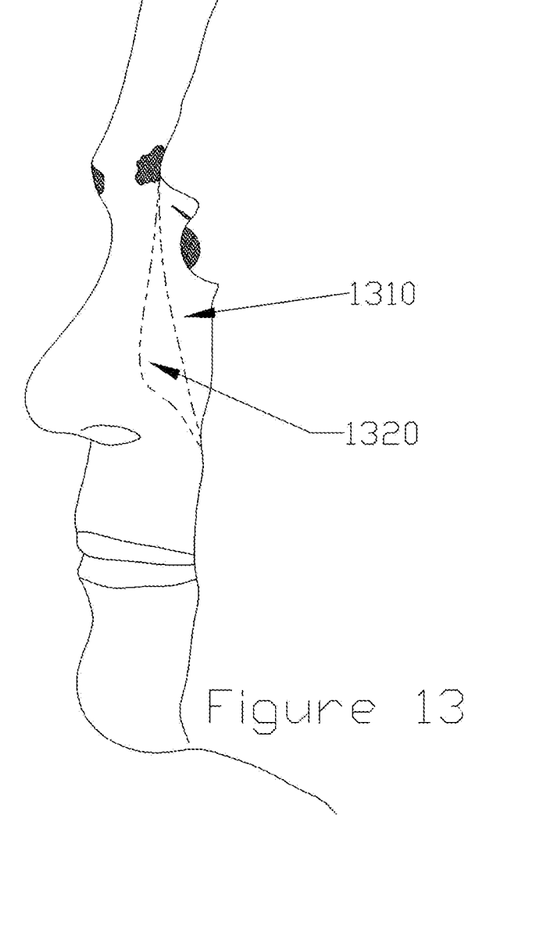
FIG. 13 is a sectioned side view showing several outer contour lines through this section of the goggle lens of the instant invention.

Referring to FIG. 13, 1310 is a contour line through a hydrodynamically streamlined profile. 1320 is a contour line through another useful profile. This profile represented by contour line 1320 will increase drag, but will also increase the inward hydrodynamical force applied to the lenses. This helps keep the goggles in the correct position particularly during a diving entry. The profile illustrated by contour line 1320 does not present corners that stick out into the free stream such as those exhibited by the 4,051,557 goggles, for example, as shown in prior art goggles of FIG. 3.

Pressure profile devices such as spoilers, airfoils, hydrofoils, flaps, and slats can be appended to the goggle profile to help provide retention of the goggles to the head.

For ease of plastic injection molding these goggles may be configured to provide for an approximately uniformly thick lens section.

Figure 10:
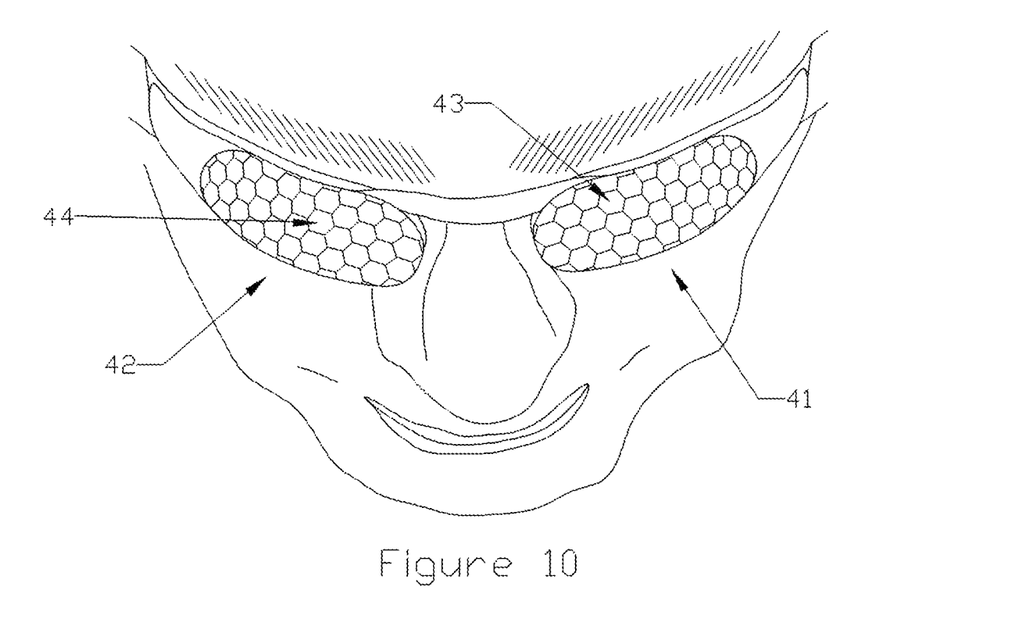
FIG. 10 is a perspective view of goggles of the invention having an alternative optical array pattern.

The refractive surfaces 600, 610 may vary in shape. For example, refractive surfaces 43, 44 may have hexagonal or other shapes as shown in FIG. 10.

Optically blackening, opaquing or dulling one or more of the return surfaces 620, 630, 625, and 635 may generate less glare for the swimmer. Blackening or dulling the return surfaces does not restrict the region of view. It only reduces the glare within the region of view.

The techniques disclosed in the instant invention are most useful for the region of binocular vision. For peripheral vision outside of the binocular region simple curved sections of clear material that match the desired outer profile may be acceptable. For many people the limits of binocular vision is about 30 degrees to each side.

Lenses of the present invention may be fabricated from clear or tinted plastic or from clear or tinted glass. Examples of suitable plastics include polycarbonate and acrylic. Eye seals or eye cups may be fabricated from an elastomer, an elastomeric foam, or soft plastic that minimizes leakage of water into the area adjacent to the eyes. Six materials commonly used for this purpose are chloroprene rubber, chloroprene foam rubber, EPDM, EPDM foam rubber, silicone rubber, and plasticized PVC.

Fabrication and sealing techniques known to those skilled in the art may be used to fabricate a complete set of goggles including a bridge connecting the left and right lenses together and an elastomeric head strap for holding the goggles to the head. Commonly used materials for bridges are polyethylene, polypropylene, polybutylene, acrylic, polycarbonate, polyurethane, plasticized PVC, or elastomers such as silicone rubber, natural rubber, chloroprene rubber, or EPDM. Head straps are commonly constructed from elastomers such as natural rubber including natural latex rubber, chloroprene rubber, EPDM, silicone rubber, or thermoplastic polymers such as polyurethane or plasticized PVC.

As many changes are possible to the swimming goggle and lens embodiments of this invention, utilizing the teachings thereof, the description above and the accompanying drawings should be interpreted in the illustrative and not in the limited sense.

That which is claimed is:

1. Swimming and diving goggles comprising:
    a) a left lens structure which is adjacent to the left eye when worn by a user,
    b) a right lens structure which is adjacent to the right eye when worn by a user, each said lens structure having an exterior surface and a viewing region, each said viewing region having a sub-region, wherein said exterior surface of each said lens structure includes an inner surface and an outer surface, said outer surface of each lens having an optical array in said sub-region of said viewing region, each said optical array having at least two refractive surfaces connected by a return surface,
    c) whereby when a right ray entering the right lens is parallel to a left ray entering the left lens, and when the right ray exits the inner surface of the right lens on a trajectory to intersect the center of rotation of the right eye and whereby the left ray exits the inner surface of the left lens on a trajectory to intersect the center of rotation of left eye, the normal to said left refractive surface at the point of the left ray's entry into said left outer surface of said left lens is approximately parallel to the normal to said right refractive surface at the point of the right ray's entry into said right outer surface of said right lens, to thereby provide that said left and right rays are approximately parallel to each other while passing through and while within the left and right lens structures.

2. The swimming and diving goggles of claim 1, wherein said left and right lens structures include optical arrays in said left and right inner surface of each said lens structure and wherein each said optical array consists of at least two refractive surfaces connected by a return surface.

3. The swimming and diving goggles of claim 2, wherein for a sub-region of the said viewing region of the said left lens for each ray which is on a trajectory to intersect the center of rotation of the left eye after passing through the left lens wherein the normal to the inner refractive surface at the point of exit from the left lens of said ray is approximately parallel to the normal to the inner refractive surface at the point of exit to the ray that is on a trajectory to intersect the center of rotation of the right eye after passing through the right lens and is parallel to the said ray segment that enters the outer refractive surface of the left lens before entering the outer refractive surface of the right lens.

4. Swimming and diving goggles of claim 1, wherein said outer refractive surfaces within said sub-region of said left lens are approximately flat and parallel to each other and are approximately flat and parallel to said outer refractive surfaces within said sub-region of said right lens.

5. Swimming and diving goggle of claim 4, wherein said inner refractive surfaces within said sub-region of said left lens are approximately flat and parallel to each other and are approximately flat and parallel to said inner refractive surfaces within said sub-region of said right lens.

6. Swimming and diving goggles of claim 1, wherein said goggles include a pressure profile device and wherein said profile device is selected from the group of pressure profile devices consisting of slats, flaps, spoilers and hydrofoils.

7. Swimming and diving goggles having a left lens and a right lens with a hydrodynamically streamlined profile with respect to the face of the user and to provide standard vision to the user both above and below water, comprising:
 a) said left and right lenses each having an exterior surface including an inner surface and an outer surface and a viewing region,
 b) said left and right lenses each having an optical array with a refractive surface in said inner and outer surfaces of said viewing region, said optical array providing means to direct rays to provide standard vision to the left and right eyes of the user,
 c) whereby, when a right ray entering said right lens is parallel to a left ray entering said left lens and when the right and left rays are on a trajectory to intersect the centers of rotation of the right and left eyes respectively after exiting the inner surfaces of the right and left lenses, the normal to said left refractive surface at the point of the left ray's entry into or exit from said left lens is approximately parallel to the normal to said right refractive surface at the point of the right ray's entry into or exit respectively said right lens, so that said left ray passes through said left lens parallel to said right ray passing through said right lens to thereby provide standard vision to the user above and below water.

8. The swimming and diving goggles of claim 7 wherein said optical array is comprised of at least two refractive surfaces connected by a return surface.

9. The swimming and diving goggles of claim 8 wherein each said optical array is located on said outer surfaces of said left and right lenses.

10. The swimming and diving goggles of claim 9 wherein said outer surfaces of said left and right optical arrays are flat and parallel.

11. The swimming and diving goggles of claim 8 wherein each said optical array is located on said inner surfaces of said left and right lenses.

12. The swimming and diving goggles of claim 11 wherein said inner surfaces of said left and right optical arrays are flat and parallel.

13. The swimming and diving goggles of claim 7 wherein said goggles include a pressure profile device selected from the group of pressure profile devices consisting of slats, flaps, spoilers and hydrofoils.

14. Swimming and diving goggles having a hydrodynamically streamlined profile and providing standard vision to the wearer both underwater and above water, comprising: left and right goggle lenses, each said goggle lens having an outer shape which geometrically approximates a portion of a hydronamically streamlined profile, each said goggle lens having means wherein parallel optical rays remain parallel when passing through said left and right goggle lenses for rays directed to the center of rotation of the respective left and right eye of the wearer after exiting said lenses whereby one ray passes through said left lens and one ray passes through said right lens to thereby provide standard vision to the wearer.

15. The swimming and diving goggles of claim 14, wherein each said lens has an exterior surface with an inner surface and an outer surface, said inner surface having an inner optical array and said outer surface having an outer optical array.

16. The swimming and diving goggles of claim 15, wherein said inner and outer optical arrays each have at least two refractive surfaces arranged in a flat and parallel configuration with respect to each other.

17. The swimming and diving goggles of claim 16, wherein said flat and parallel surfaces are connected by a return surface.

18. The swimming and diving goggles of claim 15, wherein said refractive surfaces are sections of approximately spherical lenses with the outer center of radius of each spherical surface approximately coincident with the center of rotation of each eye.

19. The swimming and diving goggles of claim 16, wherein one or more return surface has a treatment to minimize glare wherein said treatment is selected from the group of treatments consisting of optically blackened, opaqued or dulled surfaces.

20. The swimming and diving goggles of claim 14 further having means to hold said lenses in a streamlined profile position with respect to the eyes and face of the wearer.

* * * * *